(No Model.)
A. P. WADDELL.
HARNESS SADDLE.
No. 360,256. Patented Mar. 29, 1887.
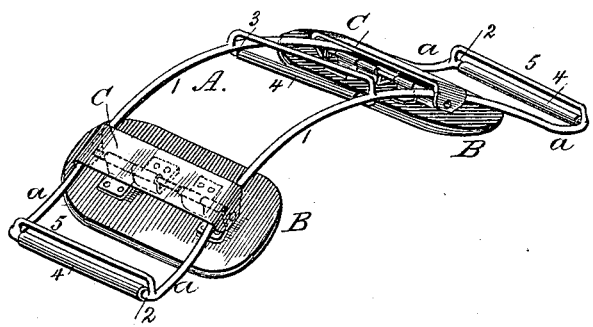
WITNESSES:
Fred G. Dieterich
P. B. Turpin.
INVENTOR:
Alex. P. Waddell
BY Munn & Co.
ATTORNEYS.

UNITED STATES PATENT OFFICE.

ALEXANDER PLEASANTS WADDELL, OF UNION CITY, TENNESSEE.

HARNESS-SADDLE.

SPECIFICATION forming part of Letters Patent No. 360,256, dated March 29, 1887.

Application filed December 24, 1886. Serial No. 222,471. (No model.)

*To all whom it may concern:*

Be it known that I, ALEXANDER PLEASANTS WADDELL, of Union City, in the county of Obion and State of Tennessee, have invented a new and useful Improvement in Harness-Saddles, of which the following is a specification.

This invention is an improved harness-saddle intended especially for use on plow, dray, and other heavy draft horses; and the invention seeks to provide a saddle which will be self-adjusting, easy, and cool to the back of the horse, and can be manufactured at a small cost.

The invention consists in certain features of construction and novel combinations of parts, as will be described.

In the drawing, the figure is a perspective view of my improved saddle.

Manifestly, it is desirable to provide a saddle that will fit horses of different sizes and conditions, and which will afford ample ventilation to the back of the horse or mule and will protect the spine from contact by the back-band.

In my invention I provide an elastic or spring tree, A, and independently-adjustable pads B. Now, by means of a spring-tree, the saddle will, in its normal position, fit a horse of a given size, or may expand or contract to fit larger or smaller horses, and in such variation of size the pads adjust themselves to properly bear on the animal's back. By hinging or pivoting the pads, so they will adjust in the different adjustments of the tree, I am able to use pads with larger bearing-surfaces for contact with the animal than would be otherwise possible.

The tree is extended at *a* laterally beyond the pads, and such extensions are provided at their outer ends with bearings for the back-band, which, when drawn tightly, operates in a measure to draw the outer ends of the tree in, and so elevate the central or crown portion thereof, which might otherwise, in some instances, be drawn down against the animal's back.

In carrying out my invention it is preferred to form the tree for plow-harness of a frame made of wire. It may be No. 9 to No. 16 bed-spring wire; but I may use any other form of steel, and heavier for dray or cart. This frame has its side bars or rods, 1, properly curved and connected at their ends by cross-rods 2, and centrally between their ends by rods 3.

The end cross-rods may also be of spring-wire, if desired, and they and rod 3 form bearings for the back-band.

It is usually preferred to place sleeves 4 on these rods 2 and 3, thus providing anti-friction bearings for the back-band and increasing the ease with which the animal may move, and avoiding any galling of the animal likely to result from the movement of the saddle by the back-band. Keeper-rods 5 are also provided above the bearings 2 3 to keep the back-band in proper position.

It will be seen that in addition to its capacity of adjustment to fit different-sized animals the spring-tree is advantageous, in that it permits a certain slight give of the back-band, thus rendering the saddle easier and more comfortable.

My saddle affords a full ventilation of the animal's back, and prevents any seesawing of the back-band across the spine. Where the animal on which the saddle is to be used is so far off size that it (the saddle) will not adjust to fit, the tree may be put in a vise and bent as far as necessary, and this bending will not operate detrimentally to the elasticity of such spring. Guard-plates C C are extended above the hinge-connections of the pads, to prevent wearing-contact between the back-band and such connections, and also give proper strength to the tree.

Having thus described my invention, what I claim as new is—

1. A harness-saddle consisting of the spring-metal tree having side bars and cross-bars and an intermediate or central cross-bar, and the pads connected with such tree between the said central and end bars, substantially as set forth.

2. A harness-saddle having a spring-wire tree formed with side bars, end and central or intermediate cross-bars, and the pads, the tree being extended beyond the pads and having bearings at the outer end of such extensions, substantially as set forth.

3. The improved harness-saddle herein described, comprising the tree formed of spring-wire side bars or other forms of steel, 1, connected by cross-rods 2 and 3, and the pads hinged or pivoted to said tree, substantially as set forth.

4. The harness-saddle herein described, consisting of the tree formed of spring-wire side bars or other forms of steel, 1, connected by end cross-rod, 2, and central cross-rod, 3, the pads hinged or pivotally connected to the tree, the keepers 5, and the plates C C, substantially as set forth.

ALEXANDER PLEASANTS WADDELL.

Witnesses:
GEO. G. BELL,
FRED WADDELL.